(12) United States Patent
Jakob et al.

(10) Patent No.: US 10,770,934 B2
(45) Date of Patent: Sep. 8, 2020

(54) ELECTRICAL MACHINE

(71) Applicant: REISHAUER AG, Wallisellen (CH)

(72) Inventors: Ronald Jakob, Russikon (CH); Roman Fürderer, Ramsen (CH); Erwin Sennhauser, Kleinandelfingen (CH)

(73) Assignee: REISHAUER AG, Wallisellen (CH)

( * ) Notice: Subject to any disclaimer, the term of this patent is extended or adjusted under 35 U.S.C. 154(b) by 163 days.

(21) Appl. No.: 15/548,287

(22) PCT Filed: Jan. 22, 2016

(86) PCT No.: PCT/EP2016/051360
§ 371 (c)(1),
(2) Date: Aug. 2, 2017

(87) PCT Pub. No.: WO2016/124426
PCT Pub. Date: Aug. 11, 2016

(65) Prior Publication Data
US 2018/0013325 A1   Jan. 11, 2018

(30) Foreign Application Priority Data
Feb. 3, 2015   (CH) .......................... 130/15

(51) Int. Cl.
*H02K 5/24*   (2006.01)
*H02K 1/18*   (2006.01)
(Continued)

(52) U.S. Cl.
CPC ............... *H02K 1/185* (2013.01); *H02K 5/15* (2013.01); *H02K 5/1732* (2013.01); *H02K 5/20* (2013.01); *H02K 5/24* (2013.01)

(58) Field of Classification Search
CPC ................... H02K 1/185; H02K 5/24
See application file for complete search history.

(56) References Cited

U.S. PATENT DOCUMENTS 1,688,891 A * 10/1928 Spreen ................. H02K 1/185
310/410
3,693,035 A * 9/1972 Ostwald ............... H02K 1/185
310/216.128

(Continued)

FOREIGN PATENT DOCUMENTS

DE         103 28 800 A1    2/2005
DE   10 2009 001 948 A1    9/2010

(Continued)

OTHER PUBLICATIONS

"Synchron-Einbaumotoren 1FE1" (Synchronous Built-in Motors 1FE1), Projektierungshandbuch, simodrive, Siemens AG, Published Sep. 2008, pp. 15-18, Order No. 6SN1 197-0AC00-1AP0, Chapter 1.

(Continued)

*Primary Examiner* — Dang D Le
(74) *Attorney, Agent, or Firm* — Sughrue Mion, PLLC

(57) ABSTRACT

The invention relates to an electrical machine having a rotor (1), a stator (2) radially surrounding the rotor, and a housing (4) radially surrounding the stator. In order to minimize stresses in the housing and nonetheless decrease the tendency of the stator to torsional vibrations, the stator is connected to the housing at least at one end in a radially and torsionally rigid but axially movable manner, for example, by way of an axially compliant material area. The electrical machine can, in particular, be a motor spindle in a gear finishing machine.

24 Claims, 6 Drawing Sheets

(51) Int. Cl.
  *H02K 5/20* (2006.01)
  *H02K 5/173* (2006.01)
  *H02K 5/15* (2006.01)

(56) References Cited

U.S. PATENT DOCUMENTS

| | | | | |
|---|---|---|---|---|
| 4,920,293 | A * | 4/1990 | Kanda | H02K 16/04 |
| | | | | 310/116 |
| 5,619,389 | A * | 4/1997 | Dunfield | G11B 19/2018 |
| | | | | 310/216.124 |
| 6,144,137 | A * | 11/2000 | Engelbert | B62D 5/0403 |
| | | | | 310/410 |
| 6,160,331 | A * | 12/2000 | Morreale | H02K 1/18 |
| | | | | 310/51 |
| 6,770,996 | B2 * | 8/2004 | Yoshida | H02K 5/15 |
| | | | | 310/201 |
| 2013/0136630 | A1 | 5/2013 | Eguchi | |

FOREIGN PATENT DOCUMENTS

| | | |
|---|---|---|
| EP | 1 271 747 A1 | 1/2003 |
| WO | 2013/087255 A2 | 6/2013 |

OTHER PUBLICATIONS

International Search Report for PCT/EP2016/051360, dated Apr. 19, 2016.
International Preliminary Report on Patentability with a Translation of Written Opinion issued from the International Bureau in counterpart International Application No. PCT/EP2016/051360, dated Aug. 17, 2017.

* cited by examiner

ELECTRICAL MACHINE

CROSS REFERENCE TO RELATED APPLICATIONS

This application is a National Stage of International Application No. PCT/EP2016/051360 filed Jan. 22, 2016, claiming priority based on Swiss Patent Application No. 00130/15 filed Feb. 3, 2015, the contents of all of which are incorporated herein by reference in their entirety.

TECHNICAL FIELD

The present invention relates to an electrical machine comprising a rotor, a stator radially surrounding the rotor and a housing radially surrounding the stator, as well as to a method of manufacturing such an electrical machine. The electrical machine can in particular be a motor spindle for a machine tool that can serve to drive a rotating tool or workpiece. The machine tool can in particular be a machine for fine finishing of gears, for example, a gear grinding machine.

PRIOR ART

Known motor spindles comprise a rotatable spindle shaft, which is supported in a fixed bearing and a floating bearing arrangement. To accommodate both bearings, bearing shields are formed on the spindle nose and the spindle end, wherein the fixed bearing is usually seated directly in a bore in the housing sleeve and the bearing shield serves only to position the fixed bearing axially, while the floating bearing is usually seated in a bore in the bearing shield. The spindle shaft supports the rotor of an electrical motor. The rotor is surrounded by the stator of the motor. This stator is arranged in a stationary housing.

For instance, the DE 103 28 800 A1 discloses an electrical machine comprising a rotor, a stator surrounding the rotor and a housing surrounding the stator. The stator is press-fit mounted into the housing by means of compliant rails.

Power dissipation in the stator during operation causes the temperature of the stator and the adjacent components to rise. These components consist of different materials, and when they are heated, stresses and strains result, which can have an adverse effect on the behavior of the motor spindle. Consequently, adequate cooling of the stator is required for higher power outputs.

From the prior art it is known to arrange the stator in a stator sleeve, past which a cooling medium is directed. For instance, EP 1 271 747 A1 discloses an electrical motor comprising a rotor, a stator surrounding the rotor, which is radially delimited outwardly by means of a stator sleeve, and a housing surrounding the stator. The housing is terminated at the drive end and at the non-drive end respectively by means of a flange. The stator sleeve is supported at both respective ends by one of the flanges.

However, despite cooling the temperature of the stator will usually rise relative to the housing during operation. This leads to a thermal expansion of the stator sleeve relative to the housing. This can lead to considerable thermal stresses and strains. If, for example, the stator sleeve is made of steel, having a length of 200 millimeters, and is heated during operation by just 2 K relative to the housing, the length of the stator sleeve will expand by approx. 5 micrometers relative to the housing. That alone corresponds to the order of magnitude of a normal bearing preload. In practice, even far greater temperature differences can arise, which can result in significantly greater relative changes in length. These can reach a range up to 100 micrometers. It is clear that without special technical countermeasures such linear expansions can lead to considerable stress loads and deformation through to irreversible damage to the whole spindle system.

Therefore, it is known to connect only one end of the stator to the housing. The other end of the stator remains free. In this way, the stator is able to expand unhindered when heated, without thermal stresses and strains occurring in the motor spindle. For example, such an arrangement is known from the configuration manual "Synchron-Einbaumotoren 1FE1" (Synchronous Built-in Motors 1FE1), published September 2008, Siemens AG, Order no.: 6SN1 197-0AC00-1AP0, Chapter 1, pages 15-18.

However, such an arrangement can lead to considerable torsional oscillations at the free end of the stator. At resonances in the lower frequency range the torsional oscillations reach high amplitudes, which can then significantly impair the dynamic system of the motor spindle. This is particularly problematic in the case of motor spindles designed to drive tools or workpieces in fine surface finishing machines, because due to the nature of the process high, rapidly changing torques, which favor the excitation of torsional oscillations, are transmitted between rotor and stator in such machines.

SUMMARY OF THE INVENTION

Consequently, it is an object of the present invention to specify an electrical machine that largely avoids axial stresses and strains resulting from the occurrence of process-induced heat and overall improves the oscillatory characteristics of a motor spindle.

This object is achieved by means of an electrical machine with the features of claim 1. Further embodiments are specified in the dependent claims.

Consequently, an electrical machine is proposed that comprises:

a rotor that is rotatably supported around an axis of rotation and defines an axial direction with its axis of rotation;
a stator radially surrounding the rotor; and
a housing radially surrounding the stator.

To reduce the tendency of the stator to torsional oscillations and at the same time avoid thermal stresses and strains, the stator, at its distal and/or proximal ends, is connected to the housing in a radially and torsionally stiff, but axially moveable manner.

Consequently, a connection is created to the housing at least at one end of the stator that, while fixing the respective end in the circumferential direction and in the radial direction with a high level of stiffness, therefore preventing movements in these directions, also facilitates axial movability of the respective end. In this way, an over-definition of the system consisting of housing and stator is avoided, which can lead to undesirable stresses in an axial direction. At the same time the tendency to torsional oscillations is effectively reduced. This is expressed in higher frequencies and lower amplitudes of resonances in the lower frequency range, which can have an extremely negative impact during operation.

Preferably, the stator is connected to the housing axially, radially and torsionally stiff at one end (meaning totally rigid) and connected to the housing axially movably only at the other end. In this way, the connection of the stator with the housing is simplified and the tendency to oscillate minimized. In this case the end designated as the distal end is that end that is rigidly connected to the housing.

When the stator is rigidly connected to the housing at the distal end and this connection is furthermore so designed that it can absorb bending moments (for example, in the case of a threaded connection) the housing is also additionally stiffened by the design according to the invention with regard to bending stresses. Bending oscillations can be excited in particular by means of process-related bending moments being transmitted from the rotor to the housing via the bearings. The solution according to the invention also leads to higher frequencies and lower amplitudes in the case of these oscillations. Thus, the negative influence of these oscillations on operation can also be reduced.

The stator can preferably comprise a radial, outwardly delimiting stator sleeve having a distal first end and a proximal second end. The actual stator package that usually comprises an assembly of stator windings, which, for example, can be potted with a potting compound, can then be fitted rigidly into this stator sleeve, for example, glued, potted or pressed in. In this case, it is preferred that the mechanical connection of the stator with the housing is essentially exclusively created via the stator sleeve. In other words, it is preferred that the load between the stator and the housing is transmitted exclusively via the stator sleeve. Therefore, in this case it is the stator sleeve that, at its distal and/or proximal ends, is connected radially and torsionally stiff, but axially movable with the housing. In this case, the stator sleeve is preferably connected rigidly (in other words, axially, radially and torsionally stiff) at its distal end to the housing, while axial movability is provided only at the proximal end. However, it is also conceivable to distribute the axial movability of the stator sleeve relative to the housing to both ends of the stator sleeve, in particular, to distribute the axial movability uniformly (in other words, with essentially the same axial elastic constant).

The electrical machine is preferably a motor spindle for a machine tool, in particular for a machine for fine finishing of gears. In particular, it can be a tool spindle and/or a workpiece spindle of a machine for fine finishing of gears, wherein the term "tool spindle" in particular shall be understood to include a spindle for the dressing tool. The electrical machine can also be a different type of motor or an electric generator.

In the case of motor spindles the rotor comprises a spindle shaft, the spindle nose of which projects out of the housing to facilitate connecting a payload to the spindle shaft. The spindle nose will also be referred to in the following as the output end of the motor spindle. Lines for hydraulic fluid and/or compressed air as well as grinding oil are often routed out of the housing at the other spindle end opposite the output end.

When the distal end of the stator is rigidly connected to the housing, this end preferably faces towards the spindle nose. Accordingly, the proximal, axially movable end of the stator in this case preferably faces towards the spindle end opposite the output end. However, a reverse arrangement is also conceivable.

The rotor is journaled in the housing. At least two bearings are preferably provided between the rotor and the housing or elements rigidly connected with the housing. The first (distal) bearing is preferably located distally from the distal end of the stator; in the case of a motor spindle preferably viewed in the axial direction between the distal end of the stator and the spindle nose. The second (proximal) bearing is preferably located proximally from the proximal end of the stator; in the case of a motor spindle preferably viewed in the axial direction between the proximal end of the stator and the spindle end opposite the output end. The distal bearing is preferably formed axially as a fixed bearing, while the proximal bearing is axially formed as a floating bearing. In some cases, it is possible to go without the proximal bearing, in particular when the rotor and the stator can be designed short relative to the rotor diameter. However, it is also possible to reverse the roles of the fixed bearing and floating bearing. The bearings can be formed in a manner known per se.

As previously described at least one end of the stator is connected to the housing in a radially and torsionally stiff, but axially movable manner. Preferably, this connection is radially and torsionally play-free. A radial and torsional play-free, stiff, but axially movable connection of one end of the stator to the housing can be achieved by connecting the respective end of the stator (in particular the stator sleeve) to the housing by means of an axially compliant material section. In this connection it is preferred that the axially compliant material section, in axial direction and in linear approximation, has an axial stiffness (spring constant in Hooke's Law) of not more than 5000 newton per micrometer, in particular preferred not more than 2000 newton per micrometer, particularly preferred not more than 500 newton per micrometer for small axial deflections in the range of a few micrometers (for example, 5-100 micrometers). On the other hand, the respective end of the stator is preferably axially not completely free, but rather axially connected in a defined manner with the housing; in other words, an axial force acts on the respective end, which varies in response to axial deflections of the respective end. Thus, it is preferred when an axial spring constant of at least approx. 100 newton per micrometer acts on this end between the stator end and the housing. In contrast, if the distal end is rigidly connected to the housing, the distal end of the connection between the stator (or the stator sleeve) and the housing is preferably axially stiff to such an extent that a spring constant cannot be meaningfully defined or rather can be considered in practical terms as infinitely large. For deflections in the circumferential direction (torsion) and in radial direction (bending) the connection with the housing is extremely stiff at both the distal end and also at the proximal end of the stator or the stator sleeve.

The axially compliant material section can be characterized in particular as having an annular flange shape. In this case, it forms an annular section that extends at least partially in a radial direction between the stator or the stator sleeve and a housing element.

An annular flange shaped, axially compliant material section preferably comprises a material thickness (gauge) that is less than its expansion (width) in a radial direction. Such an annular flange shaped material section facilitates axial movability in that the material section deforms around a reference circle in an axial direction when an axial force acts upon its inner circumference relative to its outer circumference. If, for example, the axially compliant material section is formed from steel, it is preferred that it comprises a gauge in the axial direction of 0.5-8 millimeters, preferably 1.5-5 millimeters, preferably 2-3 mm. In the radial direction it is preferred that the axially compliant material section has a radial width of 5-30 millimeters, preferably 10-15 millimeters.

The annular flange shaped, axially compliant material section can be connected at its inner circumference with the stator or the stator sleeve and at its outer circumference with the housing element or vice versa. Both connections should then be formed axially, radially and torsionally stiff.

The axially compliant material section can be in particular formed in one piece with a housing element and connected axially, radially and torsionally stiff with the stator or the stator sleeve. The housing element can be in particular a bearing shield, which supports a bearing for the rotor. However, the axially compliant material section can also be formed in one piece with the stator sleeve and connected axially, radially and torsionally stiff with a separately formed housing element, for example, the previously mentioned bearing shield or a flange of a housing sleeve.

The axially compliant material section can be formed at a retaining ring, which is formed separately from the stator or the stator sleeve and from the housing. The retaining ring is connected axially, radially and torsionally stiff at its inner circumference with the stator or the stator sleeve and at its outer circumference with the housing (or vice versa). The retaining ring can, for example, be pressed onto the stator sleeve by a first clamping ring and onto the housing by a second clamping ring to create a friction-locked connection in each case. In this case, the retaining ring is clamped axially at the inner circumference between the first clamping ring and the stator sleeve, and the first clamping ring is connected to the stator sleeve by means of screws or other means of fastening. Accordingly, the retaining ring is clamped axially at the outer circumference between the second clamping ring and a housing element, and the second clamping ring is connected to the housing element by means of screws or other means of fastening. It is also possible to reverse the roles of the inner and outer circumferences. It will be appreciated that other types of connections are possible between the retaining ring and the stator or the housing. The retaining ring can be made of metal, in particular steel; however, it can also consist of plastic, in particular a fiber reinforced (for example, a glass-fiber reinforced or carbon-fiber reinforced) plastic. One advantage of a separately manufactured retaining ring is that its shape and material thickness can be modified to specifications.

Furthermore multi-piece parts are conceivable, wherein viscoelastic material is arranged in the axially compliant material section. In this case, this not only facilitates an axial movability of the respective end of the stator, but oscillations of the respective end are also dampened. For this purpose a viscoelastic material such as rubber, nitrile butadiene rubber (NBR) or similar materials can be incorporated into in the axially compliant material section by vulcanization.

It can prove advantageous in certain situations if under normal conditions the stator or the stator sleeve is axially preloaded in compression or tension relative to the housing. In other words, it can prove advantageous if the stator is connected at its ends with the housing such that an axial tensile force or an axial compressive force acts on the stator, if both the stator or the stator sleeve as well as the housing exhibit the same temperature, in particular room temperature (20° C.). An axial compressive force can in particular prove advantageous in cases where a rigid form-fit connection exists at the distal end of the stator, as described below in greater detail. The axial compressive force can then contribute to maintaining the form-fit connection at the distal end of the stator. In comparison, an axial tensile force can prove advantageous if a rigid connection at the distal end of the stator is created in a different manner, for example, by means of screws, or if both ends of the stator are connected axially movable with the housing. In this case, if the temperature of the stator rises relative to the housing the axial tensile force is reduced between the stator and the housing due to the linear expansion of the stator. Ideally, the axial tensile force is reduced to almost zero during operations under normal conditions. In this manner, it is possible to minimize mechanical stresses and strains in the electrical machine during operations under normal conditions.

All axially, radially and torsionally stiff connections (meaning in particular the rigid connection between the distal end of the stator and the housing, provided that it exists, or the connection between the axially compliant sector and the respective end of the stator or the housing) can be implemented as a friction-locked or form-fit connection. It is possible to achieve a friction-locked connection by pressing the respective parts axially against one another by means of suitable threaded elements and/or spring elements with corresponding fastening elements. For this purpose one of the parts (in particular the distal end and/or the proximal end of the stator sleeve) can comprise an annular, axial front face, preferably with a high coefficient of friction, or a conical contact surface (a coaxial friction cone), and the other part (in particular a housing element) can comprise a corresponding complementary formed mating face. A conical contact surface provides the advantage that on the one hand a greater friction force and as a consequence a greater torsional stiffness can result. On the other hand a conical surface arranged coaxially to the axis of rotation can also contribute towards correctly centering the stator.

In the case of a form-fit connection it is preferred if this is formed play-free. For this purpose it is possible to provide in particular a Hirth joint between the stator or the stator sleeve and the housing. However, as an alternative it is possible incorporate other elements to produce a play-free, form-fit connection, such as taper pins, wedges, eccentric parts and so forth.

The stator sleeve is preferably formed as a cooling sleeve. For this purpose one or several cooling channels are preferably formed between the stator sleeve and the housing to direct a fluid cooling medium, in particular water, oil or air. These cooling channels can be formed in particular by one or several recesses/grooves or ribs on the outside of the stator sleeve, for example by one or several helically arranged grooves or ribs. Seals can be provided between the stator sleeve and the housing, which seal the cooling channels to the outside.

To manufacture an electrical machine of the type mentioned above in which the stator sleeve is specifically axially preloaded in compression or tension or is relieved as far as possible of axial forces, a process is proposed in which a stator sleeve and an element to be connected at one end to the stator sleeve (in particular a housing element, such as a proximal bearing shield or a retaining ring) are initially made available axially oversized in relation to one another. The process subsequently consists of refinishing the respective end of the stator sleeve and/or the element to be connected to the respective end of the stator sleeve such that following assembly either an axial oversize remains to exert an axial compressive force on the stator sleeve, or that a negative axial allowance (in other words, an air gap prior to creating the connection) is created to exert an axial tensile force to the stator sleeve following assembly, or it comprises a refinishing step to ensure the parts are of approximately equal size. The stator sleeve and the element are subsequently joined together. This manufacturing process to achieve a defined axial tensile force or an axial compressive force requires both the stator or the stator sleeve as well as the housing to exhibit the same temperature, in particular a room temperature of approx. 20° C.

BRIEF DESCRIPTION OF THE DRAWINGS

Preferred embodiments of the invention are described below with reference to the drawings, which are provided for information purposes only and are not to be interpreted as limiting. The drawings show.

DESCRIPTION OF PREFERRED EMBODIMENTS

A first embodiment of a motor spindle according to the invention is illustrated in FIGS. 1-4.

Figure 1:
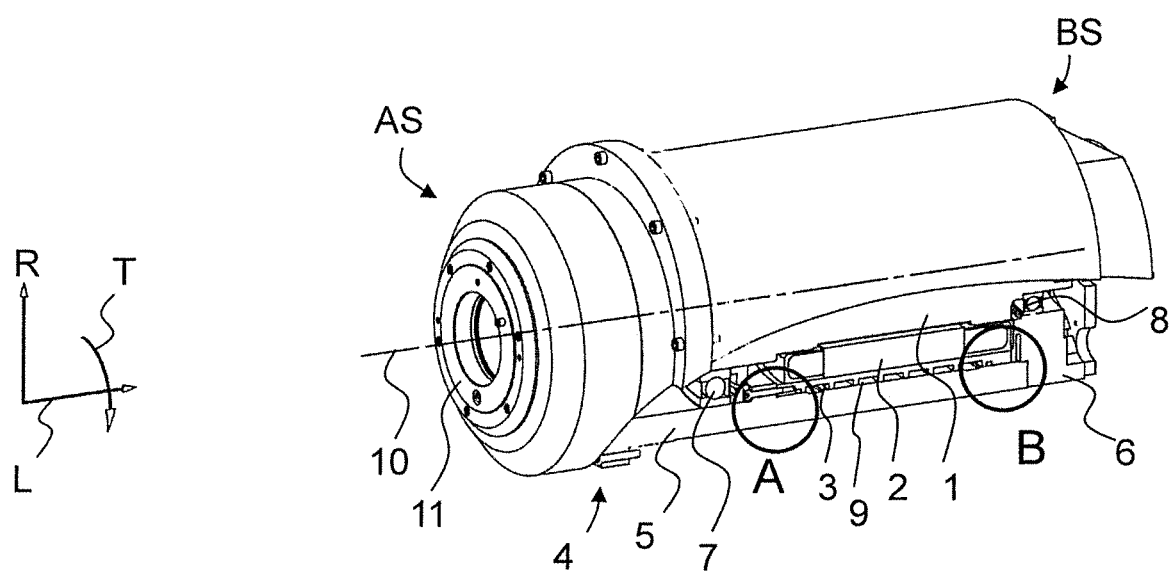
FIG. 1 a perspective partial sectional view of a motor spindle according to a first embodiment of the invention.

As can be seen in FIG. 1 the motor spindle comprises a rotor 1, which comprises a spindle shaft 11 and which is rotatably supported in a housing 4 such that it can rotate around an axis of rotation 10. The spindle shaft 11 projects out of the housing 4 at the distal end AS of the motor spindle. At this end it is possible to clamp a workpiece, a dressing tool or a gear grinding tool onto the spindle shaft 11.

The opposite end of the motor spindle is referred to in the following as the proximal end BS.

By its axis of rotation 10 the spindle shaft defines an axial direction (longitudinal direction) L, a bundle of radial directions R and a circumferential direction (tangential direction) T.

The rotor 1 is provided with permanent magnets on its outer circumference. It is surrounded by a stator 2, which comprises several coil packs. Rotor 1 and stator 2 together form a synchronous motor. However, other types of motors are also conceivable, in particular asynchronous motors.

The stator 2 comprises a stator sleeve 3 on its outer circumference, which is bonded or potted to the coil packs over a large area. Several helical grooves 9 are formed on the outer circumference of the stator sleeve 3.

The housing 4 forms a hollow space, which completely accommodates the stator 2. The housing 4 consists of several parts. It comprises inter alia a housing sleeve 5 and a proximal bearing shield 6. These two parts are screwed together rigidly. The housing sleeve 5 is essentially cylindrical and radially surrounds the stator sleeve 3. At the same time the housing sleeve 5 radially delimits the grooves 9 of the stator sleeve 3 to the outside such that these grooves form cooling channels between the stator sleeve 3 and the housing sleeve 5. The section between the stator sleeve 3 and the housing sleeve 5 is sealed to the outside by means of at least two sealing rings 16 (see FIGS. 2 and 3). During operation a fluid cooling medium, for example cooling water, cooling oil or compressed air, is directed through the cooling channels to cool the stator 2. In other words, the stator sleeve 3 acts as a cooling sleeve.

A distal bearing 7 is held in the housing sleeve 5 for the rotor 1. In relation to the axial direction L this bearing 7 is located distal from the stator sleeve 3 between the distal end 14 of the stator sleeve 3 and the spindle nose AS. The distal bearing 7 is formed in this example as a roller bearing. In the present example it acts as a fixed bearing with regard to the axial direction L; in other words, it fixes the position of the rotor 1 in relation to the housing 4 not only in a radial direction, but also in an axial direction.

A proximal bearing 8 is held for the rotor 1 in the bearing shield 6. In relation to the axial direction L this is located proximal from the stator sleeve 3 between the proximal end 15 of the stator sleeve 3 and the proximal spindle end BS. This bearing 8 is equally formed in the present example as a roller bearing. The bearing 8 acts as a floating bearing in relation to the axial direction L; in other words, it allows a certain amount of movement of the adjacent rotor section in an axial direction in relation to housing 4. However, it is also possible to reverse the roles of the fixed bearing and the floating bearing.

Figure 2:
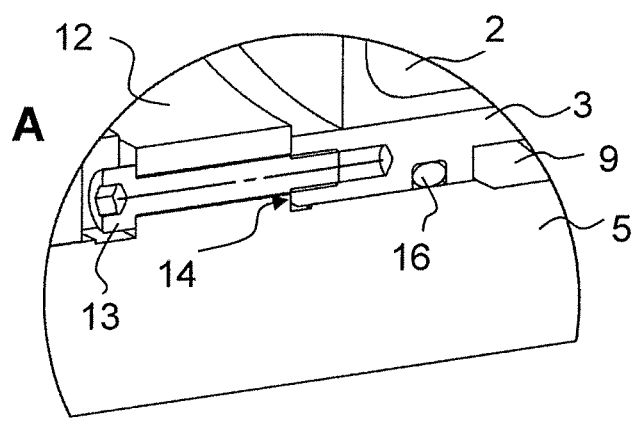
FIG. 2 the detail A of FIG. 1, which shows a first connection point between the stator sleeve and the spindle housing of the motor spindle.

The stator 2 is connected to the housing 4 exclusively via the stator sleeve 3. In FIG. 2 the connection is shown between the distal end 14 of the stator sleeve 3 and the housing sleeve 5. The distal end 14 of the stator sleeve 3 forms an annular front face that faces in the distal direction. The housing sleeve 5 comprises a radially inward extending inner flange 12. This forms a mating face that faces in the proximal direction, which is complementary to the distal front face of the stator sleeve 3 and on which this distal front face bears axially. The distal front face is pressed against the mating face at the inner flange 12 by means of multiple threaded elements 13 to form a friction-locked connection. To improve the friction-locked connection both surfaces can be machined (for example roughened) such that they exhibit an increased coefficient of friction. This connection is designed to be stiff to the maximum extent in axial direction L, in radial direction R and in circumferential direction T. From a practical point of view it can be considered to be completely rigid; in other words, under normal operating conditions this connection does not allow any measurable movement whatsoever between the housing sleeve 5 and the distal end 14 of the stator sleeve 3 in relation to the directions L, R and T.

Figure 3:
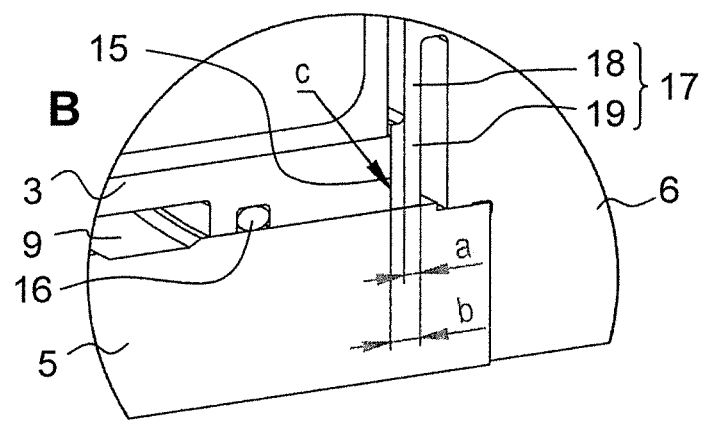
FIG. 3 the detail B of FIG. 1, which shows a first connection point between the stator sleeve and the bearing shield of the motor spindle.
Figure 4:
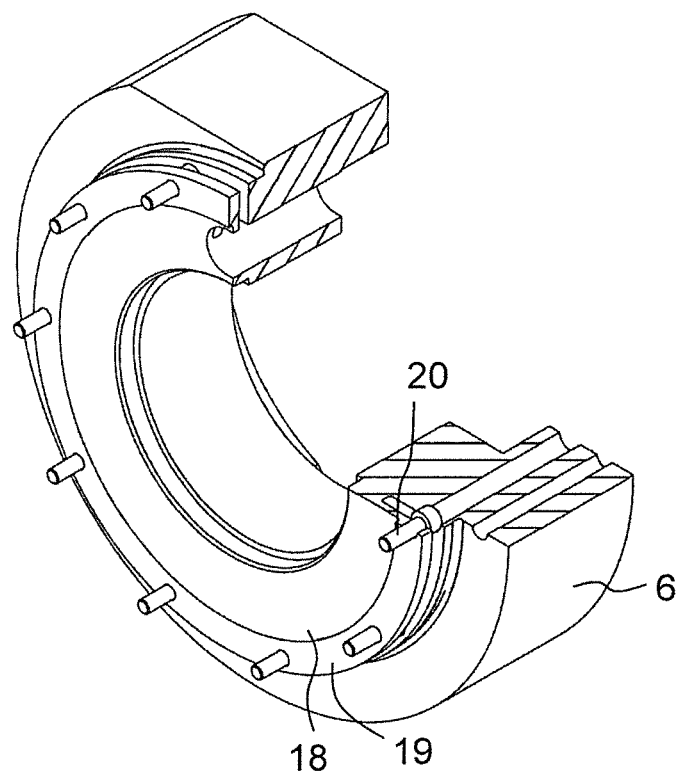
FIG. 4 a perspective partial sectional view of the bearing shield of the motor spindle in FIG. 1.

In FIGS. 3 and 4 the connection is shown between the proximal end 15 of the stator sleeve 3 and the housing 4. At the distal end of the bearing shield 6 an annular connecting flange 17 extending radially outward is formed in a section located radially inside from the housing sleeve 5. This connecting flange 17 comprises an axially compliant, annular flange shaped weakened section 18 having a material thickness a in relation to the axial direction. At its inner circumference the weakened section 18 transitions continuously in one piece into the main body of the bearing shield 6. At its outer circumference a fastening ring 19 adjoins the weakened section 18 preferably comprising a greater material thickness b. However, for structural reasons the material sections can also be implemented in such a manner that the weakened section 18 has the same as or a greater material thickness a than the fastening ring 19 with material thickness b. The proximal end 15 of the stator sleeve 3 is friction-lock connected to the fastening ring 19. For this purpose the proximal end 15 of the stator sleeve 3 forms a proximal front face, and the fastening ring 19 also forms a complementary distal mating face. These surfaces are pressed against one another by means of multiple threaded elements 20 to create a friction-locked connection. These surfaces can also be machined to increase the static friction, for example roughened. This connection is also stiff to the maximum extent in axial direction L, in radial direction R and in circumferential direction T; in other words, in practical terms completely rigid. Due to the weakened section 18 an axial movement of the proximal end 15 of the stator sleeve relative to the housing 4 is nevertheless possible.

In this example the stator sleeve 3 and the bearing shield 6 are made of steel. The weakened section 18 has a material thickness a in axial direction (in other words, a gauge) that amounts to approx. 2.5 millimeters in this example. In this way, a sufficient level of compliance of the weakened section 18 in an axial direction is achieved. This compliance results in such a manner that the weakened section 18 can be deformed elastically around a reference circle. At the same time the proximal end 15 of the stator sleeve 3 remains fixed in position in radial direction R and in circumferential direction T; in other words, the stator sleeve can only perform greatly reduced bending oscillations and torsional oscillations at this end. In this example the expansion of the weakened sector in the radial direction is approx. 10 millimeters.

Figure 5:
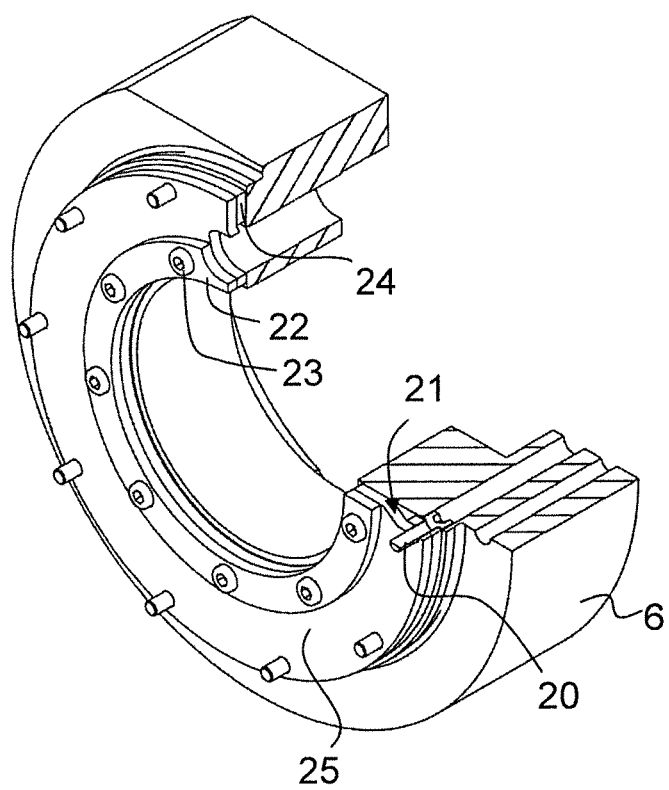
FIG. 5 a perspective partial sectional view of the bearing shield of a motor spindle according to a second embodiment of the invention.

A second embodiment of a motor spindle according to the invention is illustrated in FIG. 5. The second embodiment largely corresponds to the first embodiment; equally acting parts are provided with the same reference symbols as in the first embodiment. The second embodiment differs from the first embodiment only in the manner how the connection between the proximal end of the stator sleeve 3 and the bearing shield 6 is implemented. Consequently, only this connection section is illustrated for the second embodiment. In this embodiment the connecting flange 17 in the first embodiment is replaced by a separately formed retaining ring 21. The retaining ring 21 extends essentially in the radial direction. The retaining ring 21 is connected rigidly at its inner circumference with the bearing shield 6. For this purpose it is pressed against a distal front face of the bearing shield 6 with the aid of a clamping ring 22 and threaded elements 23 to create a friction-locked connection between the retaining ring 21 and the bearing shield 6. In contrast, the retaining ring 21 is connected rigidly at its outer circumference with the proximal end 15 of the stator sleeve 3. For this purpose it is pressed against the proximal front face of the stator sleeve by means of a second clamping ring 24 and threaded elements 20 to also create a friction-locked connection at this position. An annular, axially compliant material section 25 remains radially between the parts of the retaining ring 21 fixed in position by the clamping rings 22 and 24.

The proximal end 15 of the stator sleeve 3 is also fixed in position in this embodiment of the invention, meaning in radial direction R and circumferential direction T relative to the housing 4, while it is movable in axial direction L.

The retaining ring 21 can be fabricated from metal and/or plastic, for example glass-fiber or carbon-fiber reinforced plastic. A further embodiment can also be constructed such that both clamping rings 22 and 24 are not screwed but joined by vulcanizing a viscoelastic material such as rubber or nitrile butadiene rubber. That facilitates improved damping of oscillating parts. In such a case the retaining ring 21 can also be referred to as a damping ring.

This second embodiment can also prove advantageous from a production-engineering point of view, because the retaining ring 21 is fabricated separately from the bearing shield 6. It is advantageous primarily if the elastic properties of the bearing shield are not suitable to form the axially compliant section directly at the bearing shield.

Figure 6:
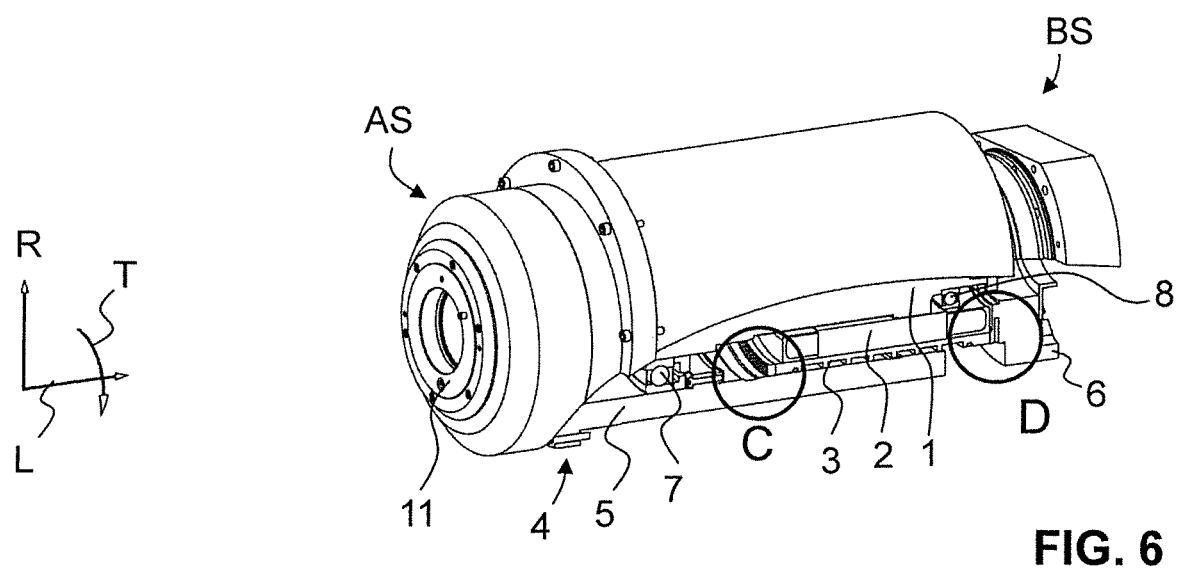
FIG. 6 a perspective exploded view with a sectional view of a motor spindle according to a third embodiment of the invention.
Figure 7:
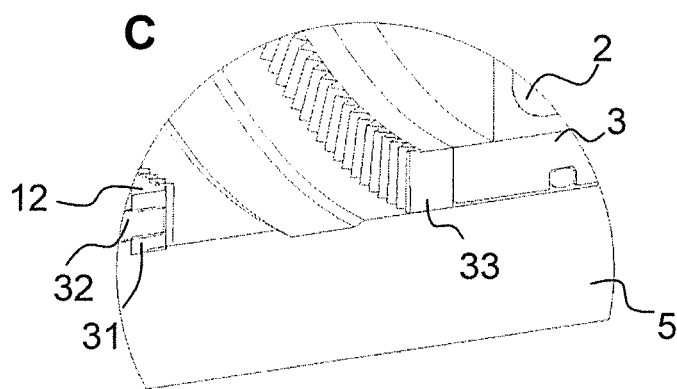
FIG. 7 the detail C of FIG. 6, which shows a first connection point between the stator sleeve and the spindle housing of the motor spindle.
Figure 8:
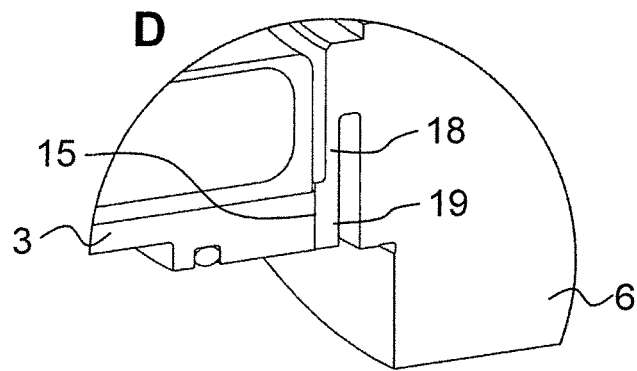
FIG. 8 the detail D of FIG. 6, which shows a first connection point between the stator sleeve and the bearing shield of the motor spindle.

A third embodiment of a motor spindle according to the invention is illustrated in FIGS. 6-8. This embodiment also largely corresponds to the first embodiment; equally acting parts are provided with the same reference symbols as in the first embodiment. The third embodiment differs from the first embodiment essentially in how the rigid connection between the distal end 14 of the stator sleeve 3 and the housing 4 is implemented. While this connection is implemented in the first embodiment by means of a friction-locked connection, this is achieved in the third embodiment by means of a play-free, form-fit connection. In concrete terms, a self-centering Hirth joint is incorporated to this end. In this case the teeth of the Hirth joint are formed very steep, with a tooth flank angle of less than 20°, here only approx. 10°. The Hirth joint comprises a first Hirth ring 31, which is rigidly mounted at the inner flange 12 of the housing sleeve 5 with screws 32, and a second Hirth ring 33, which is rigidly mounted at the distal end of the stator sleeve 3. Both Hirth rings are pressed into one another by means of an axial compressive force.

To generate the axial compressive force the stator sleeve 3 is axially preloaded in compression. For this purpose the thickness b (cf. FIG. 3) of the fastening ring 19 at the proximal end 15 of the stator sleeve 3 is chosen with an oversize such that following assembly of the motor spindle the weakened section 18 is axially preloaded in compression. Hence, a threaded connection between the distal end 14 of the stator sleeve 3 and the housing 4 is eliminated. In this way, it is possible to easily remove the stator 2 out of the housing 4 in a proximal direction for maintenance purposes, which improves the ease of maintenance of the motor spindle.

The second and third embodiments can also be combined; in other words, a Hirth joint can be provided at the distal end 14 of the stator sleeve 3 according to the third embodiment and a retaining ring and/or damping ring 21 at the proximal end 15 of the stator sleeve 3 according to the second embodiment. A Hirth joint can also alternatively or additionally be provided at the proximal end of the stator sleeve so as to connect the proximal end with the fastening ring 19 or the retaining ring and/or damping ring 21.

Figure 9:
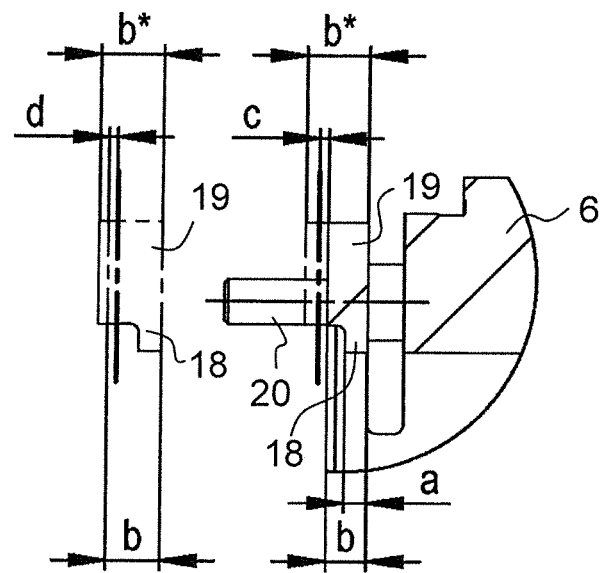
FIG. 9 a schematic sketch to illustrate the fabrication of a bearing shield.

FIG. 9 illustrates the fabrication of the fastening ring 19 with oversize d (left) or with negative allowance c (right). Initially, the fastening ring 19 has a gauge of b*. The fastening ring 19 is then refinished in an axial direction so that the gauge of the fastening ring 19 is reduced to a value b<b*.

If an axial compressive force is desired, as this is desired in particular in the third embodiment, the fastening ring 19 is refinished axially such that an oversize value d remains over and above the nominal gauge. The nominal gauge is that gauge at which the weakened section 18 remains free of stress following assembly; in other words, at which just about no axial play remains in front of the threaded joint between stator sleeve 3 and fastening ring 19, provided that the stator sleeve 3 and the housing exhibit the same temperature (in particular a temperature of 20° C.). The oversize is preferably between 5-200 microns. The oversize can be chosen relatively small. It suffices if the axial compressive force is just sufficient to securely engage the Hirth joint when the motor spindle is at a standstill. When the motor spindle is in operation the temperature of the stator sleeve 3 will rise relative to the housing 4. This leads to a linear expansion of the stator sleeve 3 relative to the housing 4, which increases the axial compressive force.

However, in alternative embodiments it can be desirable to preload the stator sleeve specifically in tension. In this case, the fastening ring 19 is refinished axially until the nominal gauge exhibits a negative allowance c. If the fastening ring 19 and the stator sleeve 3 were not screwed together, so that the weakened section 18 would be free of stress, there would be an air gap between these parts that corresponds to the negative allowance c. The negative allowance c is preferably 10-200 microns. To specifically generate a tensile force on the stator sleeve under all operating conditions of the motor spindle, the negative allowance chosen should have a value greater than the greatest expected linear expansion of the stator sleeve 3 relative to the housing 4. While the tensile force is reduced in this case if the temperature of the stator sleeve 3 rises relative to the housing 4, it will never be zero. However, it can also be desired that the tensile force be practically zero under certain operating conditions, for example at the rated load, and the dimension can be chosen correspondingly smaller for the purpose. All told, axial stress loads in the motor spindle can be controlled very well and minimized by preloading in tension.

Figure 10:
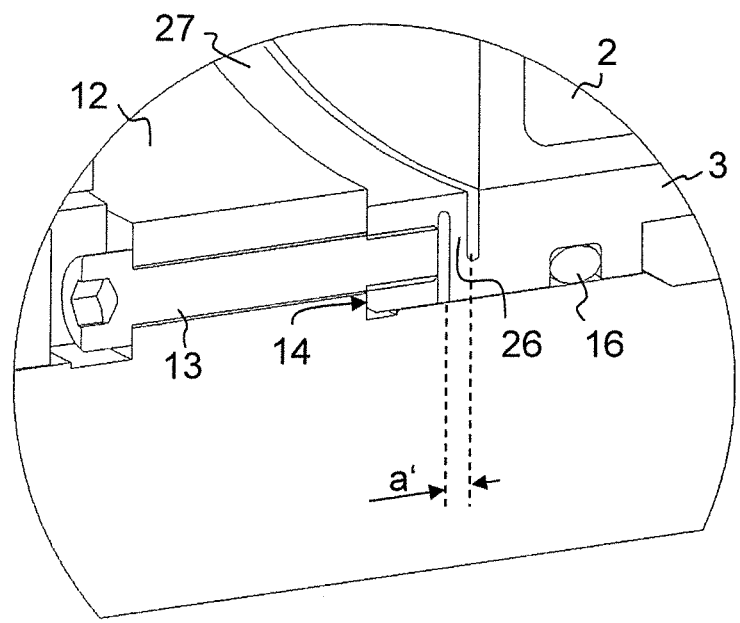
FIG. 10 a perspective sectional view of a detail of a motor spindle according to a fourth embodiment of the invention.

A fourth embodiment of a motor spindle according to the invention is illustrated in FIG. 10. The fourth embodiment largely corresponds to the first embodiment; equally acting parts are provided with the same reference symbols as in the first embodiment. The fourth embodiment differs from the first embodiment only in the manner how the connection between the distal end of the stator sleeve 3 and the housing 4 is implemented, which is namely axially movable instead of rigid. Consequently, only this connection section is illustrated for the fourth embodiment. In this embodiment an axially compliant annular flange-shaped, weakened section 26 is formed in the distal end section of the stator sleeve 3 with axial material thickness a'. At its inner circumference the axially compliant section 26 transitions continuously in one piece into an annular fastening section 27, which is friction-locked and rigidly connected to the inner flange 12 by means of threaded elements 13. At its outer circumference the axially compliant section 26 transitions continuously in one piece into the actual stator sleeve 3. In this manner, the connection of the stator sleeve 3 to the housing 4 is not only axially compliant at the proximal end, but also at the distal end. Instead of at the stator sleeve 3 the axially compliant section 26 can also be formed at the inner flange 12 of the housing sleeve 5, provided that the housing sleeve is made of a sufficiently elastic material, such as steel for example, or a separate axially compliant intermediate component, similar to the retaining ring 21 of the second embodiment, can be provided between the distal end of the stator sleeve 3 and the inner flange 12.

A fifth, sixth, seventh, eighth and ninth embodiment of a motor spindle according to the invention are illustrated in FIGS. 11-15. These embodiments differ in turn from the first embodiment only in the manner in which the stator sleeve 3 is connected at its distal end to the housing 4. Accordingly, only the stator sleeve 3 and the respective components connected to the housing are shown in the FIGS. 11-15. Equally acting parts are provided with the same reference symbols as in the first embodiment. In all of these embodiments the connection of the distal end of the stator sleeve 3 to the housing 4 is rigid.

Figure 11:
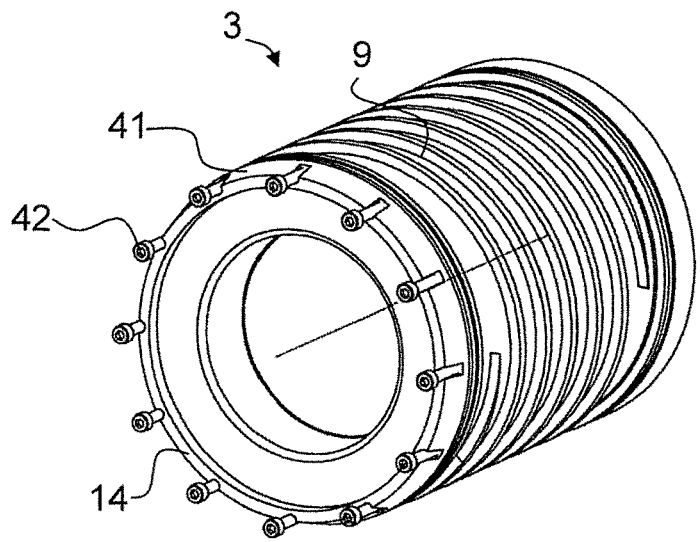
FIG. 11 a perspective view of a stator sleeve of a motor spindle according to a fifth embodiment of the invention.

In the fifth embodiment of FIG. 11 a conical contact surface 41 is formed at the distal end of the stator sleeve 3, which is arranged coaxially to the axis of rotation 10. Accordingly, a complementary mating face is formed (not shown in the drawing) at the housing sleeve 5. Both surfaces can be machined to improve the static friction, for example roughened. Both of the surfaces are pressed against one another by threaded elements 42. In this way, a friction-locked connection is created between the distal end of the stator sleeve 3 and the housing. In comparison with the first embodiment the fifth embodiment facilitates an improved friction-locked connection between the distal end of the stator sleeve 3 and the housing.

Figure 12:
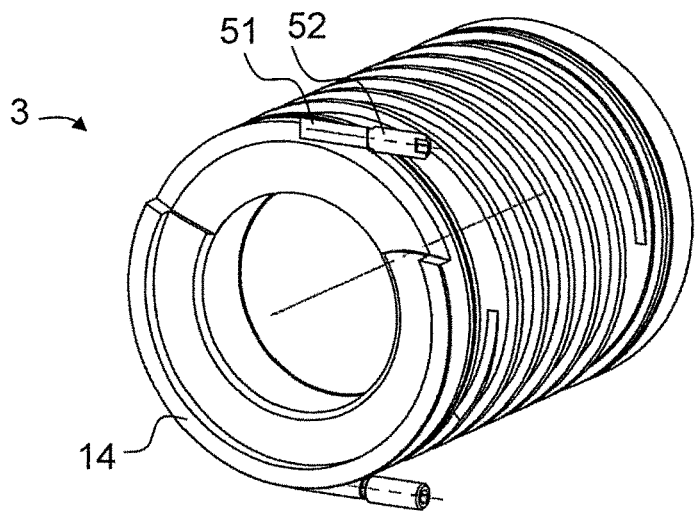
FIG. 12 a perspective partial sectional view of a stator sleeve of a motor spindle according to a sixth embodiment of the invention.

In the sixth embodiment of FIG. 12 the distal end of the stator sleeve 3 is fixed in position in the housing 4 by two tangential dowel pins 51. The dowel pins 51 are inserted tangentially through through-holes of the housing (not shown in the drawing) into blind-hole type recesses in the outer circumference of the stator sleeve 3, wherein they project out of the recesses in the housing, so that a form-fit connection is created between the housing and the stator sleeve. The dowel pins 51 are pressed against the bottom of the respective recess by tangential pressure screws 52 whose male threads engage with the female threads of the housing sleeve, which not shown in the drawing. In this way, the pressure screws 52 press the stator sleeve laterally against the inside wall of the housing sleeve via the dowel pins 51. In this way, an additional friction-locked connection is created between the outer circumference of the stator sleeve 3 and the housing, which eliminates the otherwise unavoidable play in the longitudinal direction of the dowel pins 51. As such the resulting connection is fundamentally a form-fit connection, but it also comprises a friction lock component. The arrangement of dowel pins 51 and pressure screws 52 is particularly easy to recognize in the upper section of FIG. 12, in which the stator sleeve is shown in a sectional view perpendicular to the longitudinal axis. An advantage of this embodiment is that the pressure screws 52 can easily be accessed from the outside to disengage the stator from the housing for servicing purposes, without having to also remove the entire spindle nose.

Figure 13:
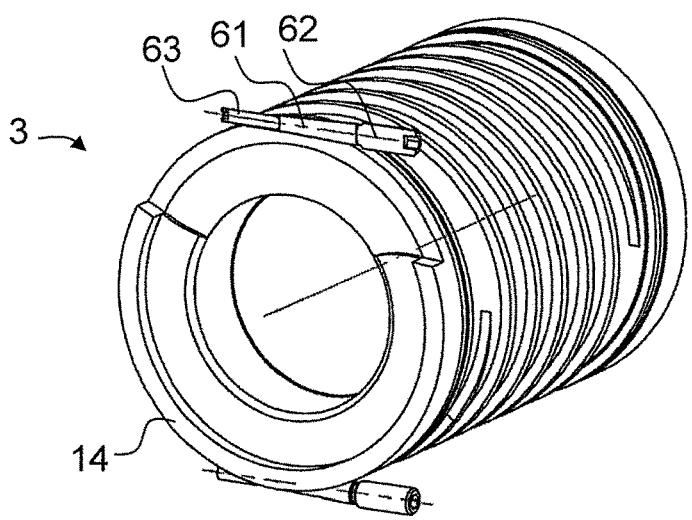
FIG. 13 a perspective partial sectional view of a stator sleeve of a motor spindle according to a seventh embodiment of the invention.

In the seventh embodiment of FIG. 13 a further variation of the connection between the distal end of the stator sleeve 3 and the housing is illustrated. In this case tangential taper pins 61 are utilized, each of which is fixed in position by means of a respective tangential pressure screw 62, whose male thread engages with a female thread of the housing sleeve. The taper pins are pressed in a tangential direction into a radial, intermediate space between the stator sleeve and the housing sleeve. In this manner, a play-free, form-fit connection is created. This connection can also be easily released for servicing purposes. Counter-pressure screws 63 serve this purpose.

Figure 14:
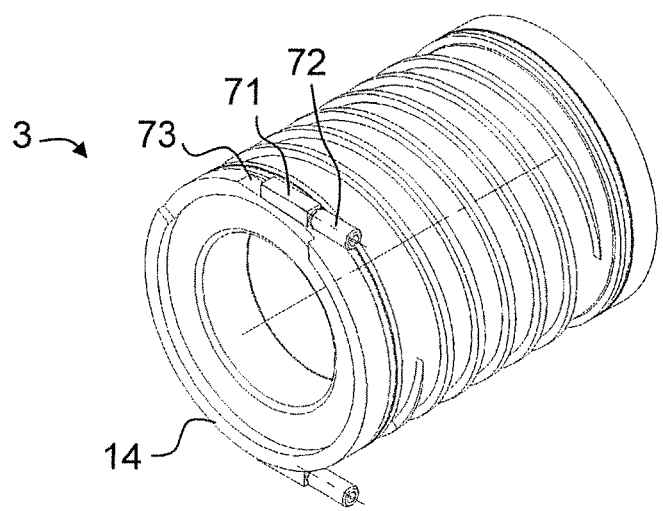
FIG. 14 a perspective partial sectional view of a stator sleeve of a motor spindle according to an eighth embodiment of the invention.

Instead of rotationally symmetric taper pins it is also possible to use non-rotationally symmetric wedges, as illustrated in the eighth embodiment of FIG. 14. In this example prismatic wedges 71 are each pressed by means of pressure screws 72 into a radial intermediate space between a locating surface 73 chamfered in a tangential direction at the stator sleeve and a corresponding locating surface at the housing sleeve. Instead of prismatic wedges general polygon wedges can also be used.

Figure 15:
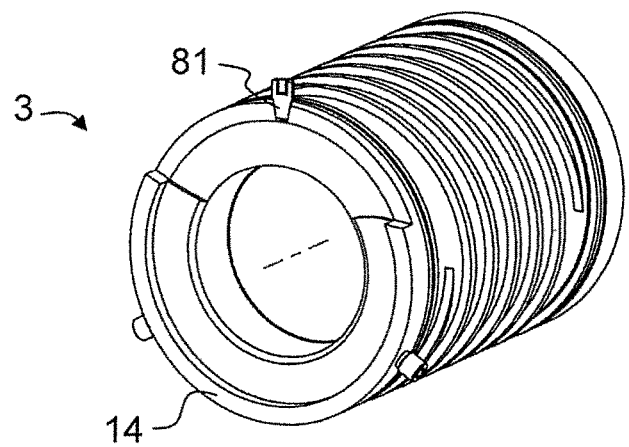
FIG. 15 a perspective partial sectional view of a stator sleeve of a motor spindle according to a ninth embodiment of the invention.

A play-free, form-fit connection is also created in the ninth embodiment of FIG. 15. In this variation radially conical pressure screws 81 are used, whose male thread engages in a respective female thread of the housing sleeve. This connection can also be easily released for servicing purposes.

There are a variety of further options to create a friction-locked or form-fit connection between the distal end of the stator sleeve and the housing. All of the connection types shown can also be used at the proximal end of the stator sleeve to connect the stator sleeve with the axially compliant section or the damping ring.

An advantage of the first, second and fifth embodiments is that the connection between the distal end of the stator sleeve and the housing is suitable to transmit bending moments around an orthogonal direction relative to the longitudinal direction. As a consequence, together with the radially and tangentially stiff connection at the proximal end of the stator sleeve the stator sleeve contributes towards improving the flexural strength of the housing.

Figure 16:
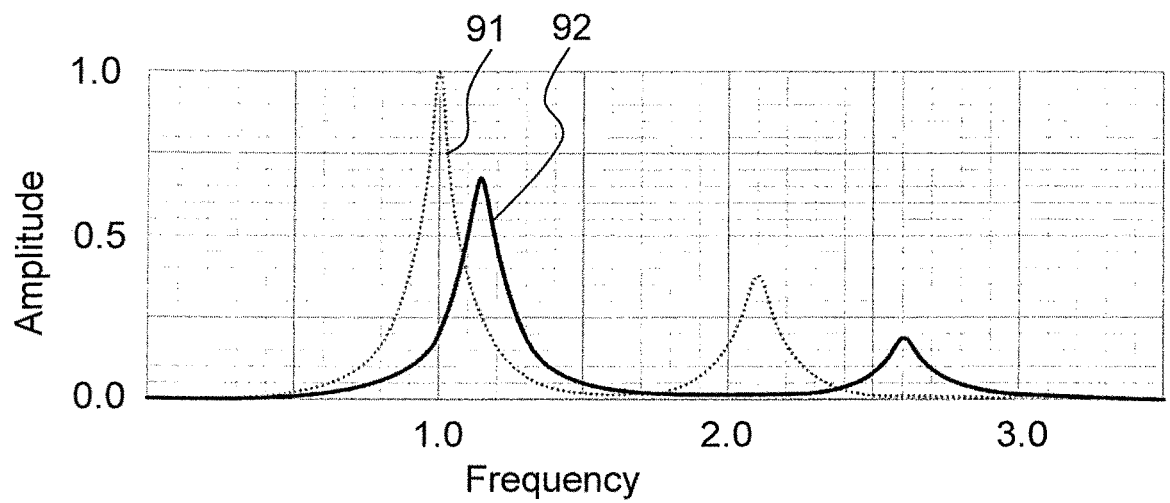
FIG. 16 a graph depicting the resonance spectra of a conventional motor spindle and a motor spindle according to the invention.

FIG. 16 shows a graph with two resonance curves that depict the torsional behavior of a motor spindle. The first resonance curve 91 was calculated for a motor spindle whose stator is connected to the housing only at one end. This motor spindle shows a strong resonance at a frequency, which is arbitrarily identified as frequency 1.0 in FIG. 16. The second resonance curve 92 was calculated for a motor spindle according to the first embodiment of the invention. It can be seen that resonances continue to occur in the lower frequency range. However, these have a significantly higher frequency and a distinctly lower amplitude. That indicates the stator is now more torsionally stiff in relation to the housing and that, in addition, torsional oscillations are less pronounced.

LIST OF REFERENCE SYMBOLS

1 Rotor
2 Stator
3 Stator sleeve
4 Housing
5 Housing sleeve
6 Bearing shield
7 Front bearing
8 Rear bearing
9 Helical groove
10 Axis of rotation
12 Inner flange
13 Threaded element
14 Forward from face
15 Rear from face
16 Sealing ring
17 Connecting flange
18 Axially compliant section
19 Fastening ring
20 Threaded element
21 Retaining ring and/or damping ring
22 Clamping ring
23 Threaded element
24 Clamping ring
25 Axially compliant section
26 Axially compliant section
27 Fastening section
31 First Hirth ring
32 Fastening screw
33 Second Hirth ring
41 Conical contact surface
42 Threaded element
51 Dowel pin
52 Pressure screw
61 Taper pin
62 Pressure screw
63 Counter-pressure screw
71 Wedge
72 Pressure screw
73 Locating surface
81 Conical pressure screw
91, 92 Resonance curve
A, B, C, D Detail views
AS Spindle nose
BS Rear spindle end
L Longitudinal direction
R Radial direction
T Circumferential direction
a, a' Thickness of the weakened area
b Thickness of fastening ring
b* Gauge prior to machining
c Dimension
d Oversize

The invention claimed is:

1. An electrical machine, comprising:
a rotor that is rotatably supported around an axis of rotation and defines an axial direction with its axis of rotation;
a stator radially surrounding the rotor, the stator having a distal end and a proximal end; and
a housing radially surrounding the stator,
wherein the stator, at at least one of its distal end and its proximal end, is connected to the housing by a connection that is radially and torsionally stiff while facilitating axial movability of said at least one of its distal end and its proximal end relative to the housing.

2. The electrical machine as claimed in claim 1, wherein the stator comprises a stator sleeve that radially delimits the stator outwardly, and wherein the stator is connected to the housing by means of the stator sleeve.

3. The electrical machine as claimed in claim 1, wherein the stator, at at least one of its distal end and its proximal end, is connected to the housing via an axially compliant material section.

4. The electrical machine as claimed in claim 3, wherein the axially compliant material section has a spring constant in an axial direction and in linear approximation of at most 5000 newton per micrometer.

5. The electrical machine as claimed in claim 3, wherein the axially compliant material section has an annular flange shape.

6. The electrical machine as claimed in claim 5, wherein the axially compliant material section has an inner circumference and an outer circumference, wherein the axially compliant material section is connected at its outer circumference axially, radially and torsionally stiff with the stator, and wherein the axially compliant material section is connected at its outer circumference axially, radially and torsionally stiff with the housing, or vice versa.

7. The electrical machine as claimed in claim 3, wherein the axially compliant material section is formed from metal and has a thickness in an axial direction of 0.5-8 millimeters.

8. The electrical machine as claimed in claim 3, wherein the axially compliant material section is formed in one piece with a housing element and is connected axially, radially and torsionally stiff with the stator.

9. The electrical machine as claimed in claim 8, wherein the housing element is a bearing shield of the housing.

10. The electrical machine as claimed in claim 3, comprising a retaining ring that is formed separately from the stator and from the housing, wherein the retaining ring is connected axially, radially and torsionally stiff both with the stator as well as the housing and forms the axially compliant material section.

11. The electrical machine as claimed in claim 10, comprising a first and a second clamping ring, wherein the retaining ring is pressed at its outer circumference onto the stator by the first clamping ring and at its inner circumference onto the housing by the second clamping ring, or vice versa.

12. The electrical machine as claimed in claim 3, wherein the axially compliant material section is formed in one piece with a stator element and connected axially, radially and torsionally stiff with a housing element.

13. The electrical machine as claimed in claim 1, wherein the stator is connected to the housing such that an axial tensile force or an axial compressive force acts on the stator if the stator and the housing exhibit the same temperature.

14. The electrical machine as claimed in claim 1, wherein the stator is connected at its distal end axially, radially and torsionally stiff to the housing, and wherein the stator is connected only at its proximal end radially and torsionally stiff but axially movably to the housing.

15. The electrical machine as claimed in claim 14, wherein the stator, at its distal end, is connected to the housing by means of a form-fit or friction-locked connection.

16. The electrical machine as claimed in claim 15, wherein the distal end of the stator is connected to the housing by means of multiple axially, tangentially or radially arranged threaded elements and/or pins and/or wedges.

17. The electrical machine as claimed in claim 15, wherein the distal end of the stator is connected to the housing via a Hirth joint.

18. The electrical machine as claimed in claim 1, wherein the electrical machine comprises a first bearing for the rotor distally from the distal end of the stator and comprises a second bearing for the rotor proximally from the proximal end of the stator, and wherein the first bearing is formed axially as a fixed bearing and the second bearing is formed axially as a floating bearing.

19. The electrical machine as claimed in claim 1, wherein the electrical machine is a motor spindle for a machine tool.

20. A manufacturing method for an electrical machine as claimed in claim 1, comprising:
providing a stator sleeve and an element to be connected to one end of the stator sleeve, wherein an axial oversize exists between the stator sleeve and the element;
installing the stator sleeve and the element when they exhibit the same temperature to determine the oversize;
separating the stator sleeve and the element;
refinishing the end of the stator sleeve and/or the element to be connected in such a manner,
(a) that the axial oversize will be eliminated, or
(b) that a reduced axial oversize remains to exert an axial compressive force on the stator sleeve following assembly of the electrical machine, or
(c) that a negative axial allowance is created to exert an axial tensile force on the stator sleeve following assembly of the electrical machine; and
refitting the stator sleeve and the element.

21. The electrical machine as claimed in claim 1, wherein the connection is radially and torsionally free of play.

22. The electrical machine as claimed in claim 1, wherein the stator, at each of its distal end and its proximal end, is connected to the housing by a connection that is radially and torsionally stiff, and wherein the connection, at at least one of the distal end and the proximal end, facilitates axial movability of said at least one of its distal end and its proximal end relative to the housing.

23. The electrical machine as claimed in claim 1, wherein the stator, at each of its distal end and its proximal end, is connected to the housing by a connection that is radially and torsionally stiff and free of play, and wherein the connection, at at least one of the distal end and the proximal end, facilitates axial movability of said end relative to the housing.

24. The electrical machine as claimed in claim 1, wherein the stator and the rotor form an electric motor.

* * * * *